(12) United States Patent  
Bedord et al.

(10) Patent No.: US 10,994,250 B2  
(45) Date of Patent: May 4, 2021

(54) AGRICULTURAL FEED MIXER WITH TORQUE SENSING AUTOMATIC TRANSMISSION

(71) Applicant: Patz Corporation, Pound, WI (US)

(72) Inventors: Bradley Bedord, Crivitz, WI (US); David C. Pellman, Coleman, WI (US)

(73) Assignee: Patz Corporation, Pound, WI (US)

( * ) Notice: Subject to any disclaimer, the term of this patent is extended or adjusted under 35 U.S.C. 154(b) by 1074 days.

(21) Appl. No.: 15/257,361

(22) Filed: Sep. 6, 2016

(65) Prior Publication Data

US 2017/0065948 A1 Mar. 9, 2017

Related U.S. Application Data

(60) Provisional application No. 62/298,240, filed on Feb. 22, 2016, provisional application No. 62/214,653, (Continued)

(51) Int. Cl.
  *B01F 15/00* (2006.01)
  *F16H 61/02* (2006.01)
  (Continued)

(52) U.S. Cl.
  CPC ........ *B01F 15/00201* (2013.01); *A01K 5/001* (2013.01); *A01K 5/004* (2013.01); (Continued)

(58) Field of Classification Search
  CPC .......... B01F 15/00201; B01F 15/00253; B01F 15/00376; B01F 15/00409; (Continued)

(56) References Cited

U.S. PATENT DOCUMENTS 5,462,354 A * 10/1995 Neier ...................... B01F 7/245  
  366/314  
5,465,914 A * 11/1995 Faccia ...................... B01F 7/24  
  241/101.2

(Continued)

FOREIGN PATENT DOCUMENTS

WO  2016/009098 A1 *  1/2016  
WO  2018/145198 A1 *  8/2018

OTHER PUBLICATIONS

Pottinger—Torro Combiline Brochure—https://www.poettinger.at/download/prospekte/POETTINGER_TORRO-COMBILINE-_128.EN.1015.pdf, 2016.

*Primary Examiner* — Charles Cooley  
(74) *Attorney, Agent, or Firm* — Nicholas A. Kees; Godfrey & Kahn, S.C.

(57) ABSTRACT

A feed mixer apparatus that includes a mixing chamber for receiving feed, and having a mixing element situated therein for mixing the feed, a transmission having a plurality of gears and connected with a mixing element, a drive system having a plurality of drive system components, including the transmission, a torque sensor interconnected with at least one drive system component, a control unit having a display and a plurality of user inputs, wherein the control unit is in at least indirect communication with the transmission and the torque sensor, and wherein the control unit receives a plurality of outputs from one or more of the transmission and torque sensor, and based at least in part on the plurality of outputs, provides an output command to effectuate a gear change in the transmission.

15 Claims, 5 Drawing Sheets

Related U.S. Application Data filed on Sep. 4, 2015, provisional application No. 62/214,654, filed on Sep. 4, 2015, provisional application No. 62/214,650, filed on Sep. 4, 2015.

(51) Int. Cl.

| | |
|---|---|
| *F16H 57/025* | (2012.01) |
| *G01L 3/10* | (2006.01) |
| *A01K 5/00* | (2006.01) |
| *G01L 3/14* | (2006.01) |
| *A01K 5/02* | (2006.01) |
| *B60K 25/02* | (2006.01) |
| *G05B 19/042* | (2006.01) |
| *G05D 17/02* | (2006.01) |
| *G05B 15/02* | (2006.01) |
| *G05D 9/12* | (2006.01) |
| *B01F 7/24* | (2006.01) |
| *G05D 17/00* | (2006.01) |
| *B01F 13/00* | (2006.01) |

(52) U.S. Cl.
CPC ............. *A01K 5/02* (2013.01); *B01F 7/24* (2013.01); *B01F 13/004* (2013.01); *B01F 15/0048* (2013.01); *B01F 15/00155* (2013.01); *B01F 15/00188* (2013.01); *B01F 15/00311* (2013.01); *B01F 15/00538* (2013.01); *B60K 25/02* (2013.01); *F16H 57/025* (2013.01); *F16H 61/0204* (2013.01); *F16H 61/0206* (2013.01); *G01L 3/108* (2013.01); *G01L 3/1478* (2013.01); *G05B 15/02* (2013.01); *G05B 19/042* (2013.01); *G05D 9/12* (2013.01); *G05D 17/00* (2013.01); *G05D 17/02* (2013.01); *B01F 2015/00623* (2013.01); *B01F 2015/00629* (2013.01); *B01F 2215/0008* (2013.01); *B60K 2025/024* (2013.01); *G05B 2219/41358* (2013.01); *G05B 2219/49197* (2013.01); *G05B 2219/49255* (2013.01)

(58) Field of Classification Search
CPC .......... B01F 15/00428; B01F 15/00318; B01F 15/00311; B01F 15/00922; B01F 13/004; B01F 15/00194; B01F 15/00129; B01F 2215/0013; B01F 7/00; B01F 2215/0008; B01F 15/00831; B01F 15/00331; B01F 7/00933; B01F 7/08; B01F 7/24; B01F 7/242; B01F 7/245; B01F 15/0295; B01F 15/00188; B01F 15/00155; B01F 15/00538; B01F 15/0048; B01F 2015/00629; B01F 2015/00623; G05B 23/0264; G05B 2219/24084; G05B 2219/24067; G05B 2219/31462; G05B 2219/2663; G05B 2219/24015; G05B 2219/24055; G05B 15/02; G05B 19/042; G05B 2219/49197; G05B 2219/41358; G05B 2219/49255; G07C 5/008; G08B 21/182; A01K 5/00; A01K 5/001; A01K 5/004; A01K 5/0001; A01K 5/0208; A01K 5/02; A01B 76/00; A01C 7/20; G01L 3/1478; G01L 3/108; G05D 17/00; G05D 9/12; G05D 17/02; F16H 61/0204; F16H 57/025; F16H 61/0206; F16H 61/0213; B60K 25/02; B60K 2025/024; B60K 17/28; B60Y 2200/22

See application file for complete search history.

(56) References Cited

U.S. PATENT DOCUMENTS

| | | | | |
|---|---|---|---|---|
| 6,758,426 B2 * | 7/2004 | Have | ................. | A01K 5/004 |
| | | | | 241/101.2 |
| 7,341,372 B2 * | 3/2008 | Van Der Plas | ........ | A01K 5/004 |
| | | | | 366/141 |
| 8,651,730 B2 * | 2/2014 | Barbi | ................. | A23N 17/007 |
| | | | | 119/51.01 |
| 8,657,485 B2 * | 2/2014 | Neier | ................. | A01K 5/004 |
| | | | | 366/297 |
| 8,770,826 B2 * | 7/2014 | Tamminga | ............. | B01F 7/245 |
| | | | | 366/314 |
| 8,850,910 B1 * | 10/2014 | Have | ................. | F16H 3/66 |
| | | | | 241/32 |
| 8,960,995 B2 * | 2/2015 | McCurdy | .............. | A01K 5/002 |
| | | | | 366/141 |
| 8,960,996 B2 * | 2/2015 | McNab Kerr | ........ | A23K 50/10 |
| | | | | 366/141 |
| 9,010,991 B2 * | 4/2015 | McFarlane | ............. | B01F 7/085 |
| | | | | 366/270 |
| 9,751,058 B2 * | 9/2017 | Bedord | .................. | A01K 5/004 |
| 10,499,680 B2 * | 12/2019 | Rowntree | ........ | B01F 15/00389 |
| 2002/0179757 A1 * | 12/2002 | Have | ................. | B01F 15/00435 |
| | | | | 241/101.2 |
| 2005/0172741 A1 * | 8/2005 | Van Der Plas | ........ | A01K 5/004 |
| | | | | 74/336 R |
| 2006/0050604 A1 * | 3/2006 | Brunazzi | ................ | A01K 5/001 |
| | | | | 366/20 |
| 2006/0256647 A1 * | 11/2006 | Van Der Plas | ........ | A01K 5/004 |
| | | | | 366/141 |
| 2009/0238032 A1 * | 9/2009 | McFarlane | ............. | B01F 7/085 |
| | | | | 366/270 |
| 2011/0064865 A1 * | 3/2011 | McCurdy | .............. | A01K 5/002 |
| | | | | 426/623 |
| 2011/0112688 A1 * | 5/2011 | McCurdy | .............. | A01K 5/002 |
| | | | | 700/265 |
| 2011/0261641 A1 * | 10/2011 | Barbi | ................. | A23N 17/007 |
| | | | | 366/141 |
| 2012/0008457 A1 * | 1/2012 | Neier | ................. | A01K 5/004 |
| | | | | 366/190 |
| 2012/0065759 A1 * | 3/2012 | Kerr | ................. | A23K 50/10 |
| | | | | 700/103 |
| 2012/0069700 A1 * | 3/2012 | Tamminga | ............. | B01F 7/245 |
| | | | | 366/314 |
| 2016/0129408 A1 * | 5/2016 | Peeters | ................. | B01F 13/004 |
| | | | | 366/297 |
| 2016/0143249 A1 * | 5/2016 | Peeters | ................. | B01F 7/24 |
| | | | | 241/36 |
| 2016/0339405 A1 * | 11/2016 | Bump | ................. | B01F 13/004 |
| 2016/0339406 A1 * | 11/2016 | Bump | ................. | B01F 13/004 |
| 2016/0343231 A1 * | 11/2016 | Bump | ................. | B01F 13/004 |
| 2017/0065948 A1 * | 3/2017 | Bedord | ................. | G05D 17/02 |
| 2017/0067556 A1 * | 3/2017 | Sailer | ................. | A01K 5/004 |
| 2017/0068259 A1 * | 3/2017 | Patz | ................. | B01F 15/00155 |
| 2017/0167580 A1 * | 6/2017 | Bondioli | ................. | F16H 3/72 |
| 2018/0255823 A1 * | 9/2018 | Rowntree | ............ | A23N 17/007 |
| 2019/0366287 A1 * | 12/2019 | Rowntree | ............ | F16H 61/462 |

* cited by examiner

AGRICULTURAL FEED MIXER WITH TORQUE SENSING AUTOMATIC TRANSMISSION

CROSS-REFERENCE TO RELATED APPLICATIONS

This application claims priority from U.S. Provisional Patent Application Ser. No. 62/214,653, filed on Sep. 4, 2015, U.S. Provisional Patent Application Ser. No. 62/214,654, filed on Sep. 4, 2015, U.S. Provisional Patent Application Ser. No. 62/214,650, filed on Sep. 4, 2015, and U.S. Provisional Patent Application Ser. No. 62/298,240, filed on Feb. 22, 2016, all of which are incorporated herein by reference for all purposes.

FIELD OF THE INVENTION

This invention relates to the field of agricultural feed mixers and the means of which to drive/transmit and control power from the main power source to at least one mixing element or screw.

BACKGROUND

Agricultural feed mixers, often termed Total Mixed Ration (TMR) Mixers, have a goal of providing a homogenous mixture of ingredients that constitute a ration to be fed to livestock for maximum production, whether that production is milk or meat.

There are known methods of controlling the transmission of power from the main power source, usually a tractor engine, connected to the mixing element(s) of a livestock feed mixer by means of a power-take-off (PTO) shaft. Traditionally this had been done by using a direct drive connection from the tractor engine, through the PTO shaft, to the mixing elements. Variation in the speed of the mixing elements in a direct drive arrangement is achieved by varying the speed of the engine of the tractor. The advent of larger systems and the attendant increase in power demand brought about the use of a multi-speed gearbox (transmission) having at least two speed ranges or ratios, where a first speed produces a lower output speed than a second speed, but requires less power. One known method of selecting or shifting between the first speed and the second speed is by manual actuation of a shift lever. This method forces the operator to stop the PTO shaft, manually shift the lever to change gears, and then engage the PTO shaft again with the transmission in the different gear, to resume mixing at a different speed. This method wastes time for the operator and reduces the efficiency of the mixing process. This solution also relies on the operator to decide to shift the gearbox at an appropriate time, so as to avoid damage to a drive system components (tractor, engine, drivelines, multi-speed gearbox, mixing element gearbox/reducers), by exceeding their designed loading limits. For an operator, some of the primary indications of the magnitude of loading on these components are visual cues of how full the mixing chamber is, the weight inside the mixing chamber if equipped with a scale system, and possibly an audible cue of the strain on the main power source, such as the tractor engine.

A feed mixer equipped with a weight responsive transmission for example is described in U.S. Pat. No. 7,341,372. The transmission described there is an automatically shifting transmission, which includes a control system that shifts the gearbox based on the total weight in the mixing chamber. This method of using weight of the feed in the mixing chamber as the main input for controlling the transmission ratio is not an efficient way to prevent damage to the drive system components because the weight in the mixing chamber is not a reliable indication of loading on the drive components. The loading on the drive components can be calculated by knowing the power requirements. To know the power requirement, it is necessary to know the torque requirement and the speed at the mixing element. The feed mixer of the '372 patent is directed to relating weight in the mixer to the torque requirement at the mixing element. In a general sense, as weight increases, so should torque, especially if density of the mixing material is constant and the mixing volume is constant. This solution becomes problematic, however, in a feed mixer application when the density of one feed ingredient does not match the density of another feed ingredient. It is possible, and common, that an ingredient, such as silage, loaded into the mixer on one day has a different density than the same silage ingredient the next day, due to changes in moisture content. The difference in density between ingredients is especially true when ingredients with very different densities, such as silage, ground corn, protein, pizza crust, haylage, etc., make up the recipe or ration, and all are being mixed at one time. A wide diversity of feed types is very commonly used in a feed mixer, at least for certain rations. Thus, if the densities are not the same, then the same weight is filling a different volume, ultimately resulting in a different loading or torque requirement.

U.S. Pat. No. 5,462,354 (the '354 patent) discloses a livestock feed mixer directed to the use of an automatic transmission to deliver power from the primary mover to the mixing element of a feed mixer. The transmission described, a Central Detroit Diesel-Allison Inc. AT-545, is a conventional truck automatic transmission. It is an object of feed mixer disclosed in the '354 patent to provide a transmission system which will efficiently drive the mixing process as well as protect the drive train components. The solution presented falls short of its goals in both driving the mixing elements in an efficient way and effectively protecting the drive train components. It is desired, in the application of a feed mixer, to complete the task of mixing ingredients as fast as possible to reduce valuable time. The truck transmission described in the '354 patent is shifted in response to changes in the output speed of the transmission. Many times this style of transmission will force itself into a lower gear (i.e., speed range), when in fact the primary mover has sufficient horsepower to drive the unit at a higher speed. Systems such as this have the disadvantage of very long processing time, which for the application of a feed mixer, is considered a loss of efficiency. Additionally, the transmission described does not support safeguards to prevent a condition which would find the transmission in a "sour spot" (opposite of a "sweet spot") that causes the transmission to repetitively shift back and forth between a lower gear and a higher gear. Due to the nature of various mixing materials, rapid changes in the torque required to do the mixing, and in the resulting output speed of the mixer, may occur. An example is when a large round hay bale is added to the mixer. An ingredient such as that may have a solidly compact core and may produce large spikes in power demand as the bale is caught between the mixing element and the side wall of the mixing chamber. For the transmission described in the '354 patent, the transmission may detect a spike and shift to a lower gear, and when the spike is gone, it may then shift back to a higher gear. This constant shifting back and forth will produce extensive stress and wear on the drive train components, including the transmission itself.

SUMMARY OF THE INVENTION

An object of the present invention is to provide a feed mixer equipped with a multi-speed transmission and the capability of detecting torque demand of the mixing elements (at the load) and comparing the detected torque demand to a torque limit, the result of which is used to automatically control the transmission and the shift points between speeds (gears) on that basis.

Another object of the present invention is to provide a feed mixer with a control system that monitors the vital operating condition of the transmission's input and/or output speed, oil temperature, and oil pressure to automatically control the shifting between speeds (gears) by comparing the operating condition of these parameters to predetermined operating limits. It should be known that the vital operating conditions are not limited to the examples given; other vital transmission data may be used.

Another object of the invention is to provide a feed mixer with a control system that gives the operator flexibility to choose between operating or controlling or shifting the transmission in a "hands off" automatic manner or a failsafe semi-manual manner.

Yet another object of the invention is to provide a feed mixer with a control system that automatically, and efficiently, prevents damage to the drive and transmission.

Still another object of the present invention is to provide a feed mixer with a control system that automatically, and efficiently, produces a fully mixed and broken down batch based on input provided by the torque sensor(s).

A further object of the invention is to provide a feed mixer apparatus that includes, a mixing chamber for receiving feed, and having a mixing element situated therein for mixing the feed, a transmission having a plurality of gears and connected with a mixing element, a drive system having a plurality of drive system components, including the transmission, a torque sensor interconnected with at least one drive system component, a control unit having a display and a plurality of user inputs, wherein the control unit is in at least indirect communication with the transmission and the torque sensor, and wherein the control unit receives a plurality of outputs from one or more of the transmission and torque sensor, and based at least in part on the plurality of outputs, provides an output command to effectuate a gear change in the transmission.

A still further object of the invention is to provide a method for generating a control cycle for gear control of a transmission of a feed mixer having at least one mixing chamber, the method comprising: initiating a learning mode of a control program; receiving a control cycle identifier; starting a prime mover and engaging a power-take-off shaft interconnected with a transmission; receiving a transmission speed signal and comparing with a predetermined shift speed signal, and if the transmission speed signal is greater than the predetermined shift speed signal, then communicating an upshift command to the transmission to change to a higher gear; receiving feed material in a mixing chamber; receiving a current torque value from a torque sensor associated with the transmission, wherein the current torque value is representative of an torque load experienced by the transmission; receiving an indication to store the current torque value as a registered indicator value for shift point one; discharging the feed from the mixing chamber; and receiving an indication to store the current torque value as a registered indicator value for shift point two.

A still yet further object of the invention is to provide a method for executing a pre-programmed control cycle for shifting gears in a feed mixer transmission comprising: selecting a pre-programmed control cycle stored in a control unit in communication with a feed mixer having a mixing chamber; starting a prime mover and engaging an output of the prime mover interconnected with a transmission of the feed mixer to rotationally engage the transmission; receiving a transmission speed signal and comparing with a predetermined minimum engagement speed signal; receiving a secondary signal value from at least one transmission sensor representative of at least one transmission condition parameter and comparing the secondary signal with a pre-determined secondary signal value; receiving a torque value, derived from a torque sensor signal, that represents a torque load experienced by the transmission, and comparing the average torque value with a pre-determined torque value; upon sensing that the transmission speed signal is greater than the predetermined minimum engagement speed signal, and that the secondary signal is within the pre-determined secondary signal value, and that the torque value is less than the pre-determined maximum torque value, then communicating a shift command to the transmission to change to a higher gear; loading feed in the mixing chamber; comparing the sensed torque value received while loading feed with a first shift point value specified by the selected pre-programmed control cycle; communicating a shift command to the transmission to change to a lower gear if the sensed torque value exceeds the first shift point value; discharging feed from the mixing chamber; while discharging, comparing the sensed torque value received while discharging feed with a second shift point indicator value specified by the selected pre-programmed control cycle, and comparing the received secondary signal with the pre-determined secondary signal value, and comparing the received torque value with the pre-determined maximum torque value; upon determining that the received torque value is less than the second shift point indicator value, and that the received secondary signal is within the pre-determined secondary signal value, and that the received torque value is less than the pre-determined maximum torque value, then communicating a shift command to the transmission to change to a higher gear.

A still yet even further object of the invention is to provide a method for shifting gears in a transmission of a feed mixer, the method comprising: at least one of manually engaging the transmission in a first gear, and communicating a command from a control unit to the transmission to shift the transmission into first gear; engaging an output of a prime mover with the transmission; receiving a speed signal from a speed sensor providing a rotational speed of at least one of a transmission input shaft and a transmission output shaft associated with the transmission; detecting the rotational speed, and a plurality of transmission condition parameters, and a torque value representative of the torque load experienced by one or more drive system components; transmitting a command to shift the transmission into a subsequent higher gear upon detecting that the rotational speed is greater than a pre-determined minimum speed, and the plurality of transmission condition parameters are within pre-determined values, and the torque value is less than a pre-determined maximum torque value; and after shifting to a subsequent higher gear, detecting the rotational speed, the plurality of transmission condition parameters, and the torque value on the one or more drive system components, and if the rotational speed decreases below the pre-determined minimum speed, or the plurality of transmission condition parameters are outside of the pre-determined values, or if the torque value is less than the pre-determined maximum torque value, then sending a shift command to the transmission to shift into a lower gear.

A additional further object of the invention is to provide a method for shifting gears in a transmission of a feed mixer, the method comprising: receiving a speed signal from a speed sensor indicating a rotational speed of at least one of a transmission input shaft and a transmission output shaft; sending a shift command to the transmission to shift into a lowest gear upon receiving an indication from the speed sensor that the rotational speed is zero; detecting the rotational speed, and a plurality of transmission condition parameters, and a sensed torque load value on one or more drive system components; providing an indication that a shift to a higher gear is allowable upon detecting that the rotational speed is greater than a pre-determined minimum speed, and the plurality of transmission condition parameters are within pre-determined values, and the torque value is less than a pre-determined maximum torque value; sensing if a gear shift has occurred after the indication that a gear shift is allowable has been provided; and after shifting to a higher gear, detecting the rotational speed, the plurality of transmission condition parameters, and the sensed torque load value on the one or more drive system components, and if the rotational speed decreases below the pre-determined minimum speed, or the plurality of transmission condition parameters are outside of the pre-determined values, or if the torque value is less than the pre-determined maximum torque value, then sending a shift command to the transmission to shift into a lower gear.

DETAILED DESCRIPTION

The term "feed mixer" is used in general throughout this description and an exemplary vertical feed mixer is specifically shown, to demonstrate the effectiveness of the invention. The term feed mixer, however, applies to any agricultural feed mixing apparatuses, including but not limited to reel mixers, horizontal mixers, and any other agricultural feed mixers. The term "feed" is here on defined as material used and mixed for consumption by animals, although in some embodiments, other types of materials can be deposited in the apparatus for mixing, including non-consumable materials. As such, the system and methods of operation described herein are equally applicable to various other types of machines used to load, mix, and unload materials of various types, and it is to be understood that various terms used throughout shall be interpreted broadly, for example, the term "ingredients" is not limited to consumable materials, but can include any type of material, such as pesticides, seeds, etc.

Figure 1:
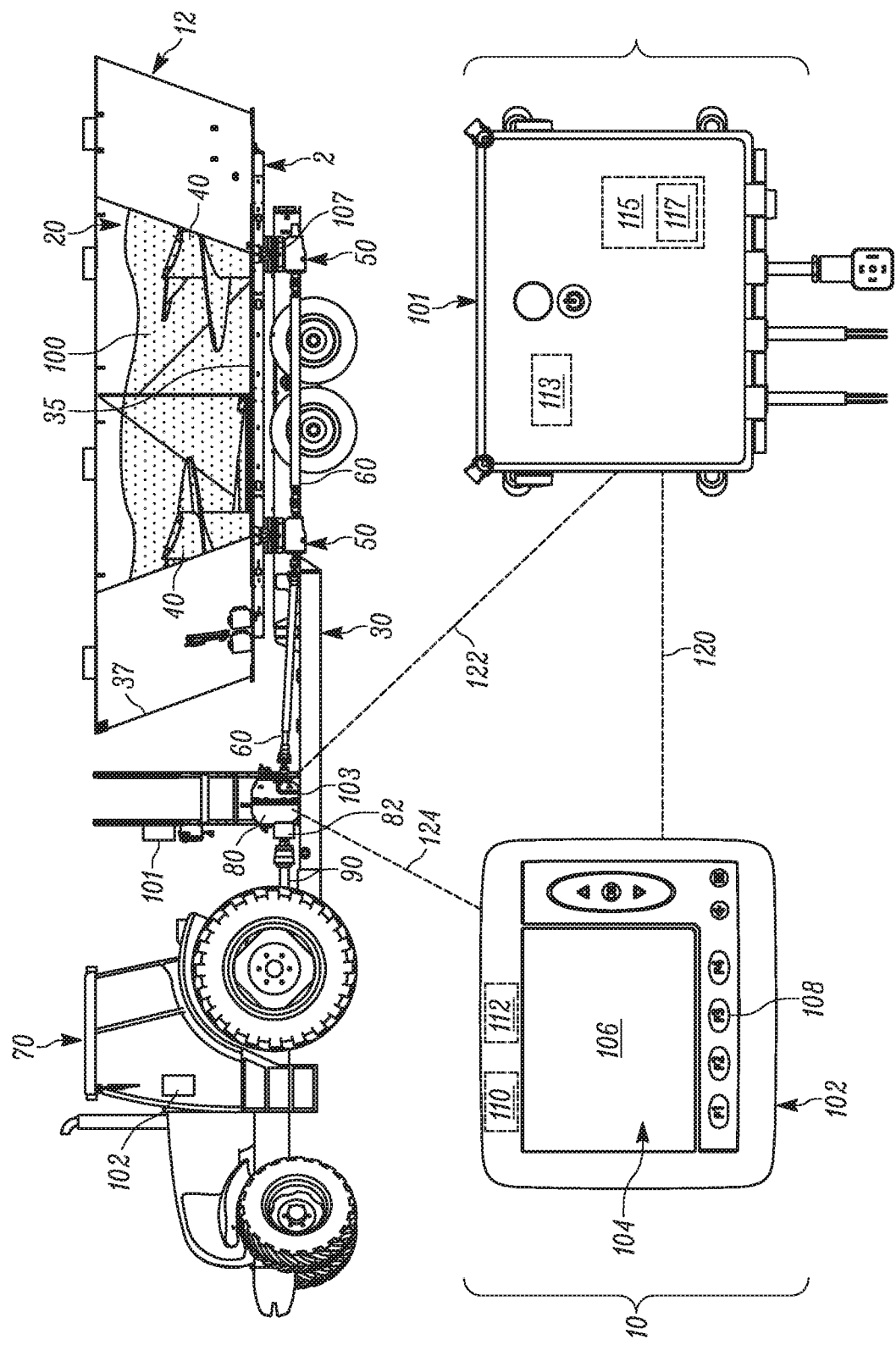
FIG. 1 shows a side elevation view of exemplary feed mixer attached to a tractor, and equipped according to the invention in a schematic representation, illustrated with some structural elements removed for illustrative purposes.

FIG. 1 shows a feed mixer 12 equipped with the invention in a partially schematic representation. Feed mixer 12 includes a frame 30 (i.e., chassis) which supports a mixing chamber 20 thereon. Mixing chamber 20 includes a mixing chamber floor 35 and mixing chamber inner walls 37 extending upwards therefrom. Inside mixing chamber 20 resides at least one mixing element 40. Mixing element 40 completes the work of mixing ingredients that have been placed within mixing chamber 20 and that are mixed to form feed 100. Mixing element 40 can include one or more of various known structures used for mixing ingredients inside a feed mixer 12, such as an auger, which is rotatable and transfers its load through an angular gearbox 50 (e.g., planetary) which is connected by common drive shafts 60 as part of a driveline. The load in the driveline is transferred through a transmission 80 (e.g., power-shift, automatic, or multi-gear, etc.) that is connected to a prime mover 70 (e.g., tractor, diesel engine, electric motor, hydraulic motor etc.). Connection between prime mover 70 and transmission 80 is described as being through a PTO shaft 90, although in other embodiments, the connection can be made through other methods, such as belt and pulleys, stub shafts, hydraulic couplings, etc.

Feed mixer 12 includes a control unit 10 which controls the speed range (gear ratio (multiples of which are hereafter referred to as "gears")) used by transmission 80 in one or more of various selectable modes, such as a Semi-Manual, Custom Automatic Mode, and Maximum Speed Automatic Mode. In at least some embodiments, control unit 10 includes a control box 101 and a controller 102, while in other embodiments control unit 10 can include more or less components performing similar, different, and additional functions. Feed mixer 12 further includes a method for measuring the torque on at least one of the drive system components. In at least some embodiments, the drive system components include, at least in part, transmission 80, prime mover 70, PTO shaft 90, drive shafts 60, angular gearbox 50, and mixing elements 40. In at least some embodiments, one such method for measuring torque includes utilizing a torque sensor arrangement, such as described in detail in U.S. Pat. Appl. entitled AGRICULTURAL FEED MIXER TRANSMISSION TORQUE SENSOR ASSEMBLY, filed on the same day as the present application and incorporated by reference herein, in its entirety. In another embodiment, the method can include an internal or surface mounted torque sensor 103 provided with, or secured to, transmission 80. In yet another embodiment, the torque sensing can be provided by use of another torque sensor arrangement interconnected with one of the drive system components 40, 50, 60, 70, 80, and 90. Irrespective of the torque sensor arrangement and specific component(s) utilized for measuring the torque, such arrangement is configured to communicate (wired or wirelessly) a torque signal to control unit 10 that is representative of a measured torque value for one of the drive system components, for use in the transmission shifting analysis, as described herein. Additionally, the measured torque signal provided to control unit 10 can be in the form of an averaged value (filtered) or an instantaneous value. If an instantaneous value is provided, such as by torque sensor 103, then the torque sensor 103 can have a built in filter for providing an averaged value as an output, in addition, or in place of that, a control program 117 in the control unit 10 can be configured to generate an average torque value over a period of time, wherein the average torque value is representative of the average torque load experienced by transmission 80 or another drive system component. Such averaging is advantageous to limit or prevent constant shifting of transmission 80 based on sensed torque surges. When performed in whole or supplementally by control unit 10, the averaging can be performed using any one of various methods known in the art. It is to be understood that the use of the term "torque sensor 103" herein is intended to represent any of the torque sensor arrangements referenced above that can provide a torque value (e.g., signal) to control unit 10, although for illustrative purposes, torque sensor 103 has been identified in FIG. 1 secured to transmission 80.

Control unit 10 can be a singular unit that performs all the functions described below for each of controller 102 and control box 101, or it can be comprised of discrete units each forming the respective functions described with reference to controller 102 and control box 101. As such, any functions described or associated with either controller 102 and control box 101 can be performed by control unit 10, and any components (e.g., control panel 104) associated therewith are also considered part of control unit 10, whether integrated or discrete. When controller 102 and control box 101 are discrete units, they can be located together or separate in various locations, such as, inside the cab of the prime mover 70, adjacent transmission 80, on feed mixer 12, etc. Control unit 10 along with the various described sensors, form a control system.

In at least some embodiments, controller 102 includes a control panel 104 and a display 106. Control panel 104, which can also be incorporated, in whole or in part, into display 106 by any suitable means, such as a touchscreen interface, can include one or more user selectable control panel inputs 108 (e.g., buttons, switches, etc.) for navigating by an operator, various control options for control unit 10. In at least some embodiments, controller 102 includes a processing component 110 (e.g., a processor) and a memory component 112 (e.g., RAM, ROM, etc.), for operating display 106, processing user provided control panel inputs 108, and communicating signals to and from control box 101, transmission 80, and various sensors, based at least on one or more received inputs.

In at least some embodiments, control box 101 includes a processing component 113 (e.g., processor) and memory component 115 for storing one or more control programs 117. In at least some embodiments, the processing component is a programmable logic controller (PLC), although in some other embodiments, various other known programmable-type controllers or processors can be utilized. Particularly when control box 101 and controller 102 are situated in a discrete arrangement, as opposed to an integrated unit, a primary communication link 120 between control box 101 and controller 102, as well as a secondary communication link 122 or 124 control unit 10 between the control box 101 and transmission 80, can be achieved using one of or a combination of, various known means, such as wired (e.g., Ethernet cabling, CANBUS, Profi-BUS, Fiber-optic, etc.) or wireless (e.g., Wi-Fi, WLAN, Bluetooth, etc.) connection. When configured as an integrated unit, either one of communication link 122 or 124 can be utilized to communicate with transmission 80.

Control box 101 receives data from transmission 80, among other things. More particularly, transmission 80 includes one or more known types of sensors that monitor the pressure, input speed, and temperature of transmission 80 (e.g., oil pressure, oil temperature, etc.), identified as transmission condition parameters. The transmission condition parameters can be communicated directly to control box 101 and/or controller 102. The transmission data, along with other data, as discussed below, allow for control program 117 to be implemented in control unit 10 which identifies or calculates the appropriate transmission shift points to control which gear (i.e., speed range) transmission 80 utilizes at a given time. Control box 101 determines and initiates the changing of gears in transmission 80 to achieve a desired speed range to effectively protect the drive system components by not allowing the drive system to operate in a potentially damaging state (e.g., overloaded). In addition, control program 117 allows for mixing processes to occur in a highly efficient and customized manner without necessary operator intervention. It is to be noted that control program 117 is stored in control unit 10, but more particularly can be stored and operated in controller 102 or in control box 101, in addition, any and all inputs and outputs discussed herein can be communicated to control unit 10, but more particularly either one of controller 102 and control box 101.

In at least some embodiments, the control system is utilized to receive data from the various sensors and provide suitable control of the shifting of transmission 80 during the loading and unloading process. In at least some embodiments, the use of torque sensor 103 can provide a primary control parameter utilized by control unit 10 to control shifting of transmission 80 along with the transmission condition parameters. As noted above, one or more of various modes can be provided. These modes can be selected at control panel 104 and provide varying operational benefits that are suitable for specific loading and unloading of feed, as described in greater detail below.

Semi-Manual Mode

Figure 2:
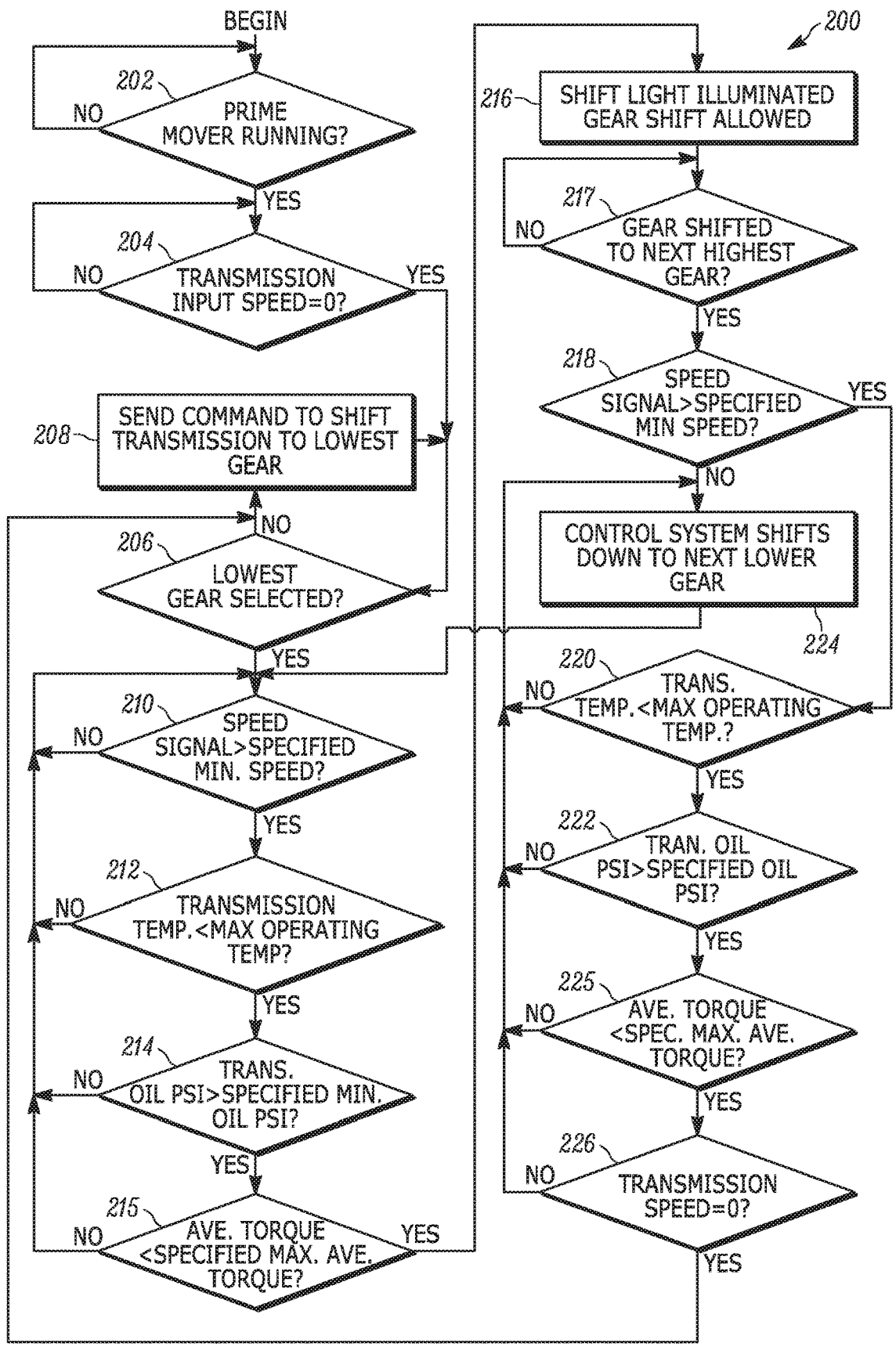
FIG. 2 is a flow chart illustrating an exemplary process for operating the feed mixer in a Semi-Manual Mode.

It will be beneficial to a user to operate in a Semi-Manual Mode when mixing new or uncommon batches of feed that may not have a specific recipe (combination of different ingredients having different properties). In this case the user may want to experiment with the shift points at which transmission 80 is shifted, because the user may not yet know how much torque is required when a shift is desired or required. An exemplary process of operating feed mixer 12 in Semi-Manual Mode will now be described with reference to flow chart 200 of FIG. 2.

Beginning at step 202, a user starts prime mover (tractor) 70, and control unit 10 checks if prime mover 70 is running, then at step 204, checks the speed signal (e.g. signal outputted from a known in the art speed sensor, for example speed sensor 82, capable of sensing the rotational speed of a drive system component, such as a transmission input shaft speed, transmission output shaft speed, etc.) for transmission 80 (or another drive system component). If the speed signal is zero, then at step 206, control unit 10 checks if transmission 80 is in its lowest drive gear (first gear). If not in first gear, then at step 208, a command is sent to transmission 80 to change to first gear.

Once transmission 80 is confirmed as being in the lowest gear, the user engages PTO shaft 90 allowing power to transfer through the drive system components and commence movement of mixing element(s) 40, generating a speed signal from transmission 80. In at least some embodiments, the speed signal can be obtained from other moving components, as discussed above, such as a rotation sensor on the driveline (e.g., drive shafts 60).

At step 210, the speed signal received from transmission 80 is compared with a specified (i.e., predetermined) minimum speed signal required for clutch engagement. If the running speed signal becomes greater than the specified minimum speed for clutch engagement of transmission 80, then the transmission condition parameters are checked. More particularly, at step 212, a transmission temperature signal (e.g., oil temperature) received by the control box 101 from transmission 80, is compared with a specified (i.e., predetermined) maximum operating temperature, for transmission 80, and if the temperature signal is less than the specified maximum operating temperature, the process continues to step 214. At step 214, a transmission pressure signal (e.g., transmission oil pressure) received from transmission 80 is compared with a specified (i.e., predetermined) minimum operating pressure signal for transmission 80, and at step 215 the average torque signal from torque sensor 103 is compared with a pre-determined maximum average torque (i.e., maximum average torque endurable by the drive system components before damage is reasonably expected to occur).

Once the running speed signal exceeds the specified (i.e., predetermined) minimum input speed signal in step 210, the transmission temperature is confirmed to be below the specified maximum operating temperature at step 212, the transmission oil pressure signal is confirmed to be above the specified minimum operating oil pressure at step 214, and the average torque signal from torque sensor 103 is confirmed to be less than a pre-determined maximum average torque at step 215, then the process moves to step 216, where an indicator (e.g., a light) is enunciated to the user (e.g., via control panel 104) that alerts the user that manual shifting is allowed. The user manually shifts transmission to the next higher speed range (gear) by pressing a control panel input 108 on control panel 104, or by actuation of another component of control unit 10. At step 217, control unit 10 checks if the transmission 80 has been shifted by the user to the next highest gear. Transmission 80 will remain in this next higher gear as long as the speed signal, temperature signal, average torque, and pressure signal, sensed by control unit 10, stay within their specified limits, as noted in steps 218, 220, 222, and 225. If at any time one of these parameters falls outside of the allowed limits, the process moves to step 224, where control unit 10 automatically shifts the transmission 80 down to a lower gear to protect drive components and the process then returns to step 210. It is sometimes desired by the user to mix the ingredients as fast as possible to save time. In at least some embodiments, the user would continue to manually advance gears in the same fashion described above until the maximum speed range (highest gear) is achieved. The user then begins loading mixing chamber 20 with various ingredients until the desired mix of feed 100 is achieved.

Once the feed 100 is fully mixed, the user can then move feed mixer 12 to an unloading location, where the user begins discharging the now-mixed feed 100 from mixing chamber 20. As feed 100 exits mixing chamber 20, the load on transmission 80 will be reduced, thereby allowing the user to manually shift to a higher gear without overtaxing transmission 80. As noted above with reference to steps 218, 220, 222, and 225, the control unit 10 continues to monitor the safety parameters throughout the unloading process in order to protect the drive system components. Once the mix has been unloaded, the user will disengage PTO shaft 90 causing the speed of transmission 80 to be substantially zero, as checked at step 226, and then the process moves to step 208, causing control unit 10 to shift transmission 80 to its lowest gear in preparation for the next process.

Custom Automatic Control Mode

In some cases it may be desired by the user to set up Custom Automatic Control Modes that do not necessarily deliver the fastest mixing and unloading. Reasons for this include, purposely mixing feed 100 at a lower speed range as to not break down certain ingredients too fast, or discharging feed 100 at a lower speed as to make the discharge process more manageable for a user. The Custom Automatic Control Mode allows the user to program a number of different custom cycles using control panel 104. Each cycle will have at least two user-settable shift points (speed range changes) based on the average torque sensed by torque sensor 103. During the loading process there is a shift down (lower speed range) point once load on the drive system components increases, and during the discharge process there is a shift up (higher speed range) point due to the decrease in load on the drive system components. In at least some embodiments, when transmission 80 has more than two gears, there can be additional shift down and shift up points used in accordance with the processes described herein. During a custom cycle the same transmission condition parameters (i.e., the safety conditions as described in the Semi-Manual Mode) hold true: speed, temperature, torque, and pressure must all be within their predefined limits for transmission 80 to operate in any speed range (gear) other than the lowest speed range (gear).

Figure 3:
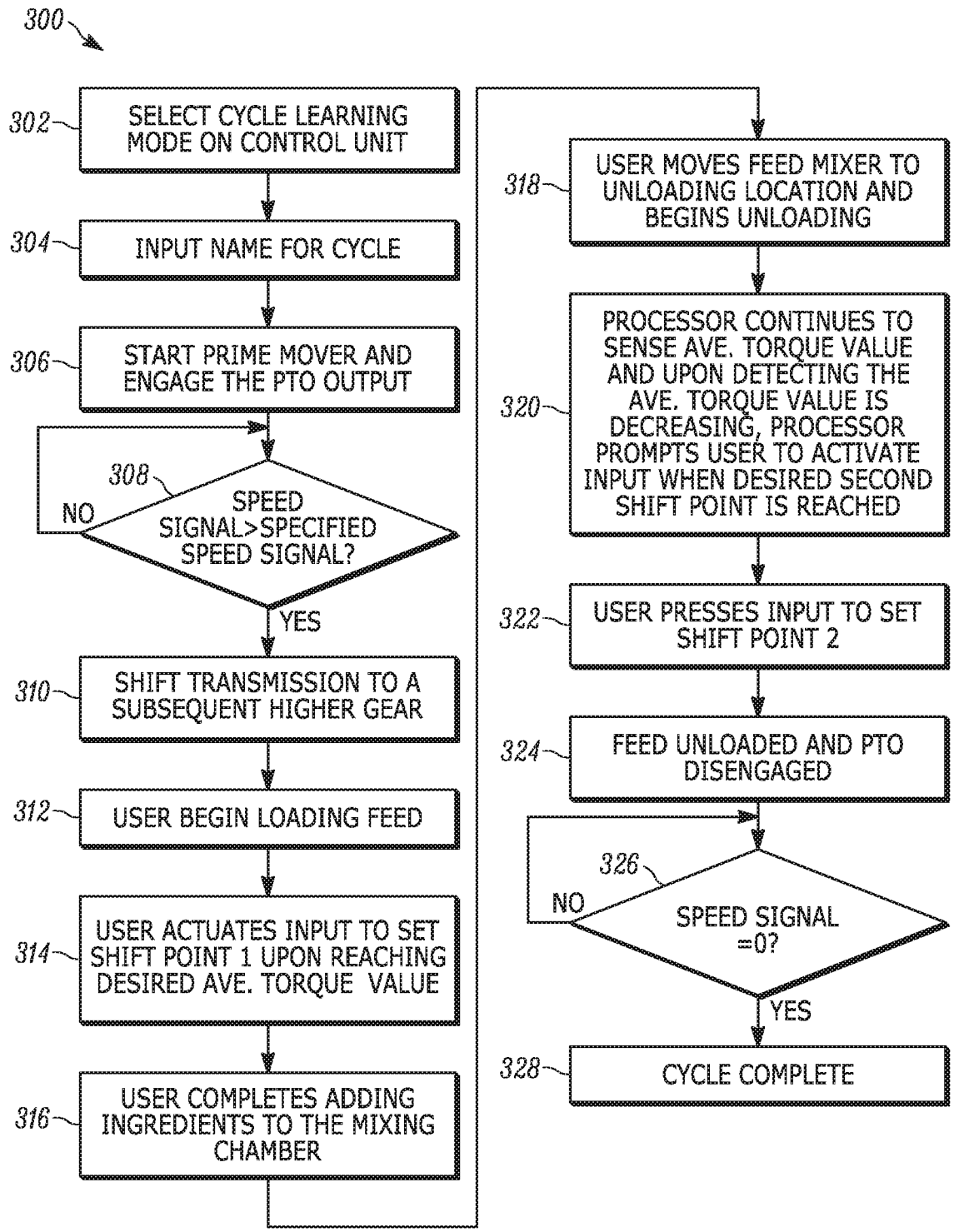
FIG. 3 is a flow chart illustrating an exemplary process to program a Custom Automatic Control Mode.

To program a custom control cycle for Custom Automatic Control Mode, the user follows the steps provided in the exemplary flow chart 300 shown in FIG. 3. Beginning at step 302, the user puts control unit 10 into a "Cycle Learning Mode" by selecting the mode via control panel 104. At step 304, the user gives the control cycle a specific name, for example "Dairy Ration" using control panel 104. At step 306, the user would then start prime mover 70 and engage PTO shaft 90, transmitting power through the drive system components to move mixing element(s) 40. Once the speed signal from the speed sensor 82 indicates a speed greater than a pre-determined minimum speed signal for clutch engagement, as determined in step 308, then at step 310, control unit 10 automatically shifts transmission 80 to a subsequent higher gear.

Control unit 10 will now recognize the user is in a "loading" section of the custom cycle, and control panel 104 can prompt the user to actuate a control panel input 108 when the first user settable gear downshift point is desired. The user then begins loading mixing chamber 20 with ingredients at step 312 until the desired gear downshift point of the custom cycle is reached, this point should occur before the maximum predefined torque limit is reached to prevent overtaxing the drive system, which in at least some embodiments, can be monitored by the user as provided to control unit 10 and displayed via control panel 104. When the desired gear downshift point for the custom cycle is met, then at step 314, the user actuates an input, such as control panel input 108, and the control unit 10 saves a sensed current average torque value, received from the torque sensor 103 via a torque sensor signal, or via the control unit 10 after being processed from the torque sensor signal, as a first shift point value, which is stored in the control unit 10 as the registered indicator value for "shift point 1". The average torque value will continue to rise until the user is finished with the loading process, due to the increasing amount of feed 100, which requires more torque to rotate mixing elements 40.

Once the loading and mixing process is completed at step 316, the user may then move feed mixer 12 to an unloading location, where the user begins discharging the now-mixed feed 100 from mixing chamber 20 at step 318. As feed 100 exits mixing chamber 20, the average torque value will decrease, and control unit 10 can recognize this change as the beginning of the unloading process and at step 320, prompts the user to activate control panel input 108 when the user settable second gear shift point is desired. The user continues to unload mixing chamber 20 until the desired second gear shift point (gear upshift to increase the speed of the transmission as the load is reduced) is reached, at which time the user actuates control panel input 108 at step 322, which prompts control unit 10 to save the current average torque value, received from the torque sensor 103, as a second shift point value, which is stored in the control unit 10 as the registered indicator value for "shift point 2". Once the feed 100 has been fully unloaded at step 324, the user will disengage PTO shaft 90, thereby reducing transmission input speed to zero, which is confirmed at step 326, causing control unit 10 to recognize that the Cycle Learning Mode is complete for the control cycle named Dairy Ration, ending the process 328. The user can now program more custom automatic control modes in the same fashion as described above.

Figure 4:
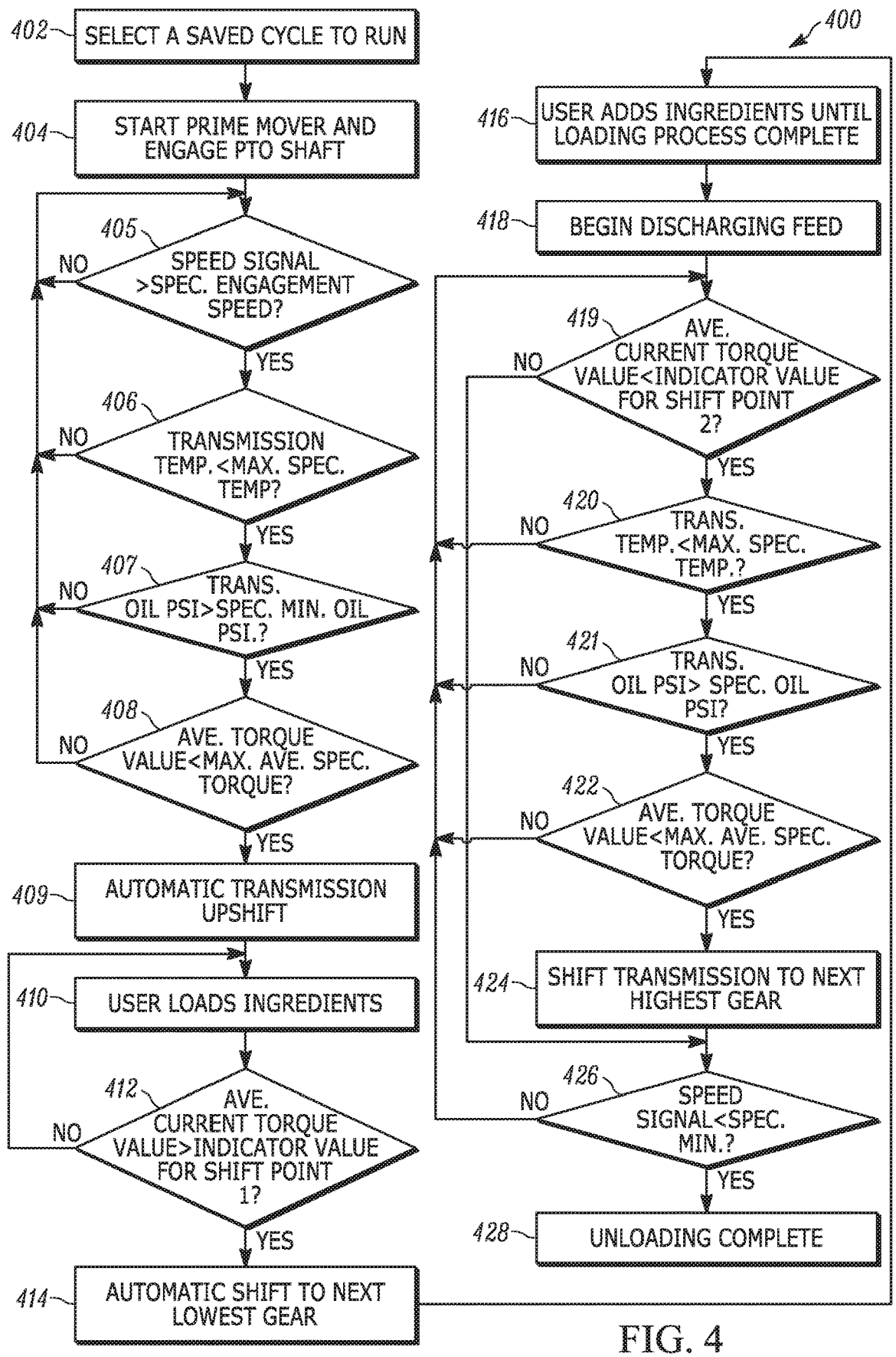
FIG. 4 is a flow chart illustrating an exemplary process for operating the feed mixer in the Custom Automatic Control Mode.

With one or more saved custom automatic control cycles completed, the user may now operate in Custom Automatic Control Mode by using control panel 104 to select a saved control cycle, for example Dairy Ration. Flow chart 400, shown in FIG. 4, provides an exemplary process for operating feed mixer 12 in Custom Automatic Control Mode. Beginning at step 402, the user selects the desired cycle from a listing of stored automatic control cycles displayed on control panel 104. At step 404, the user would start the loading process by starting prime mover 70, and engaging PTO shaft 90 to transfer power through the drive system components to start moving mixing element 40. Once the speed signal provided to control box 101 from the transmission 80, or other speed sensing component (as discussed above), communicates a value greater than the specified minimum speed for clutch engagement at step 405, and a transmission temperature is below a pre-determined maximum operating temperature of transmission 80 in step 406, and, a transmission pressure signal received from transmission 80 is above a specified (i.e., predetermined) minimum operating pressure signal for transmission 80 at step 407, and the average torque value is below a pre-determined maximum average torque for the drive components at step 408, then control unit 10 sends a command to automatically shift transmission 80 to the next higher gear at step 408 and control unit 10 recognizes the user is in the loading phase of the custom cycle. In step 410, the user begins adding the desired ingredients. In step 412, control unit 10 monitors the average torque value until the value increases above the first shift point value stored, shift point 1. Once the average torque value goes above the first registered indicator value for shift point 1, then control unit 10 automatically shifts transmission 80 to the next lower speed range (gear) at step 414. The user continues loading mixing chamber 20 with ingredients until the loading process is complete at step 416.

Once all the ingredients are added and mixed together in feed mixer 12, the result is mixed feed 100. The user may then move feed mixer 12 to an unloading location, and begin discharging feed 100 from mixing chamber 20 at step 418. As feed 100 exits mixing chamber 20, the current average torque value will decrease. At step 419, once the current average torque value decreases below the second shift point value, which is stored in the control unit 10 as the registered indicator value for shift point 2, and the transmission temperature is below the pre-determined maximum operating temperature of transmission 80 in step 420, and the transmission pressure signal received from transmission 80 is above the specified (i.e., predetermined) minimum operating pressure signal at step 421, and the average torque value is below the pre-determined maximum average torque for the drive components at step 422, then control unit 10 will automatically shift transmission 80 to the next highest gear at step 424, thereby increasing the discharge of feed 100. Once the speed signal drops below a specified minimum speed, as confirmed in step 426, control unit 10 recognizes that the custom cycle Dairy Ration is complete.

In at least some embodiments, when in Custom Automatic Control mode, once shift point 1 occurs, shifting will not be allowed until the unloading process is affirmatively detected or otherwise indicated by the user as beginning. Further, in at least some embodiments, when unloading and shift point 2 is reached, if shifting to a higher speed range causes an immediate shift down to a lower speed range, due to the fact that the temperature signal is above a specified maximum operating temperature of transmission 80, or the average torque value is above a specified maximum average torque value to safely operate the drive system components, then control unit 10 will not attempt to shift again for a predetermined period of time. If the same result happens for a user defined number of times, control unit 10 will not attempt another shift into a higher speed range until the average torque value has been lowered a pre-determined significant amount.

Maximum Speed Automatic Mode

In at least some embodiments, the most efficient way to operate a feed mixer is generally to do so in the fastest manner possible. The elimination of user steps or inputs increases the speed of operating the feed mixer. Additionally, utilizing a multi-speed transmission in its highest speed range during the filling/mixing/unloading process for as long as possible, maximizes the speed of the process. One such mode in which the invention described herein can be operated in is Maximum Speed Automatic Mode. The purpose of this mode is to operate transmission 80 in its highest speed gear for as long as possible.

Figure 5:
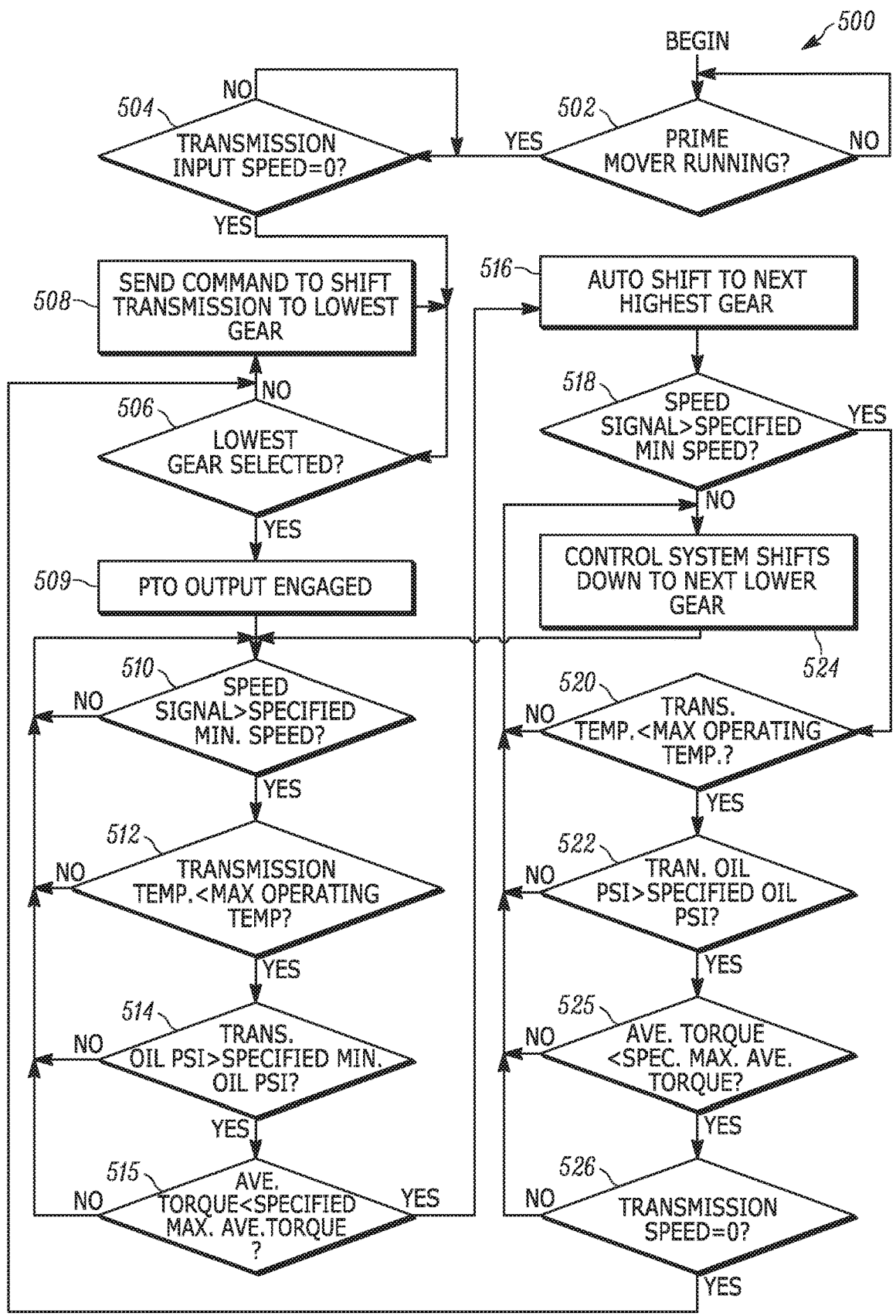
FIG. 5 is a flow chart illustrating an exemplary process for operating the feed mixer in a Maximum Speed Automatic Mode.

An exemplary process using Maximum Speed Automatic Mode is described below with reference to flowchart 500 in FIG. 5. Beginning at step 502, a user starts prime mover (tractor) 70, and control unit 10 checks if prime mover 70 is running, then checks if transmission 80 has a speed signal of zero at step 504. If the speed signal is zero, then at step 506, control unit 10 checks if transmission 80 is in its lowest drive gear (first gear). If not in first gear, then at step 508, a command is sent to transmission 80 to change to first gear.

Once transmission 80 is confirmed being in first gear, the user engages PTO shaft 90 at step 509, allowing power to transfer through the drive system components and commence movement of mixing element(s) 40, generating a speed signal from transmission 80 that is representative of the rotational speed of the transmission input or output. In at least some embodiments, the speed signal can be obtained from other moving components, such as a rotation sensor on the driveline (e.g., drive shafts 60).

At step 510, the now-running speed signal received from transmission 80 is compared with a specified (i.e., predetermined) minimum speed signal for clutch engagement. If the running speed signal becomes greater than the specified minimum speed for clutch engagement of transmission 80, then the transmission condition parameters are checked. More particularly, at step 512, the transmission temperature signal (e.g., oil temperature) received by the control panel 104 from transmission 80 is compared with a specified (i.e., predetermined) maximum operating temperature for transmission 80, and if the temperature signal is less than the specified maximum operating temperature, the process continues to step 514. At step 514, the transmission pressure signal (e.g., transmission oil pressure) received from transmission 80 is compared with a specified (i.e., predetermined) minimum operating pressure signal for transmission 80 and if the transmission pressure signal is greater than the specified minimum operating pressure signal, then the process moves to step 515. At step 515, the average torque value derived from torque sensor 103 is compared with a specified (i.e., predetermined) maximum average torque value for safely operating the drive system components, and if the derived average torque value is less than the maximum average torque value, then the process moves to step 516, where control unit 10 communicates a command to shift transmission 80 to the next higher gear. Transmission 80 will remain in this next higher gear as long as the speed signal, temperature signal, average torque value, and pressure signal, sensed by control unit 10, stay within their specified limits, as noted in steps 518, 520, 522, and 525. If at any time one of these parameters falls outside of the allowed limits, the process moves to step 524, where control unit 10 automatically shifts transmission 80 down to a lower gear. The process then returns to step 210 to check the safety parameters again, to evaluate if an upshift to the next highest gear can be performed at step 516. Once the transmission speed signal is approximately zero, as noted in step 526, the process returns to step 506 in preparation for a new process to begin. This process can continue through both the loading and unloading phase and allows for the use of a plurality of gears.

In at least some embodiments, when in Maximum Speed Automatic mode, if control unit 10 shifts transmission 80 to a higher gear, and once in the higher gear, must immediately shift down to a lower gear due to the fact that the transmission temperature signal is above a specified maximum operating transmission temperature or the average torque value derived from torque sensor 103 is above a specified maximum average torque, then control unit 10 will not attempt to upshift again for a predetermined period of time. If the same result happens for a user defined number of times, the control unit 10 will not attempt another shift up into a higher gear until the average torque value has been significantly lowered.

It is to be noted that all "pre-determined" values discussed herein can be considered "acceptable", wherein the term "acceptable" is understood to include operational values that are derived based on the operational limitations as specified by a manufacturer of the component, or otherwise derived based on reasonable expectations of safe operational parameters by a person skilled in the art of manufacturing feed mixers or the associated components. Further, it is to be noted that the term "torque value" can in some embodiments, include either one of, or both of, instantaneous torque and average torque.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. In addition, the steps described herein can include additional steps and/or deleted steps, as well as be performed in other sequences.

What is claimed is:

1. A feed mixer apparatus comprising:
   a mixing chamber for receiving feed, and having a mixing element situated therein for mixing the feed;
   a drive system having a plurality of drive system components, including a transmission, the transmission having a plurality of gear ratios and connected with the mixing element, the plurality of gear ratios including at least a higher gear ratio and a lower gear ratio;
   a torque sensor interconnected with at least one drive system component to detect the torque demand of the mixing element, wherein the torque sensor provides a torque sensor signal representative of the torque demand;
   a control unit having a display and a plurality of user inputs, wherein the control unit is in at least indirect communication with the transmission and the torque sensor, and wherein the control unit is configured to receive the torque sensor signal, compare the detected torque demand to a pre-determined torque value, and signal the transmission to shift to a different gear ratio based at least in part on the result of the comparison; and
   a speed sensor for communicating a speed signal to the control unit, wherein the speed sensor is interconnected with one of the drive system components, and wherein the control unit is configured to provide an output to the transmission to change gear ratios, based at least in part on the speed signal.

2. The apparatus of claim 1, wherein the control unit includes a processor, a memory, and a control program.

3. The apparatus of claim 2, wherein the drive system components further include a prime mover, a power-take-off shaft, a drive shaft, and an angular gearbox, and wherein the transmission receives rotational power from the power-take-off shaft of the prime mover and outputs power to the angular gearbox via the drive shaft, and wherein the angular gearbox is connected to at least one of the plurality of mixing elements to provide rotational movement thereof.

4. The apparatus of claim 1, wherein the control unit includes a discrete control box and controller.

5. The apparatus of claim 1, wherein the torque sensor includes one or more load cells interconnected with a transmission mount.

6. The apparatus of claim 1, wherein the plurality of outputs from the one or more of the transmission and torque sensor include a temperature signal and a pressure signal, and wherein the control program includes pre-determined values for safe operation of the transmission, which are compared with the temperature signal and pressure signal received by the control unit from the transmission.

7. The apparatus of claim 6, wherein the control unit provides a command to the transmission to shift to a lower gear ratio when the temperature signal received by the control unit exceeds the pre-determined value.

8. The apparatus of claim 1, wherein the output to the transmission from the control unit to change gear ratios is based on both the speed signal and the detected torque demand.

9. A feed mixer apparatus comprising:
   a mixing chamber for receiving feed, and having a mixing element situated therein for mixing the feed;
   a drive system having a plurality of drive system components, including a transmission, the transmission having a plurality of gear ratios and connected with the mixing element, the plurality of gear ratios including at least a higher gear ratio and a lower gear ratio;

a torque sensor interconnected with at least one drive system component to detect the torque demand of the mixing element, wherein the torque sensor provides a torque sensor signal representative of the torque demand;

a control unit having a display and a plurality of user inputs, wherein the control unit is in at least indirect communication with the transmission and the torque sensor, and wherein the control unit is configured to receive the torque sensor signal, compare the detected torque demand to a pre-determined torque value, and signal the transmission to shift from a higher gear ratio to a lower gear ratio or from a lower gear ratio to a higher gear ratio based at least in part on the result of the comparison; and a speed sensor for communicating a speed signal to the control unit, wherein the speed sensor is interconnected with one of the drive system components, and wherein the control unit is configured to provide an output to the transmission to change gear ratios, based at least in part on the speed signal.

10. The apparatus of claim 9, wherein the control unit includes a processor, a memory, and a control program.

11. The apparatus of claim 10, wherein the drive system components further include a prime mover, a power-take-off shaft, a drive shaft, and an angular gearbox, and wherein the transmission receives rotational power from the power-take-off shaft of the prime mover and outputs power to the angular gearbox via the drive shaft, and wherein the angular gearbox is connected to at least one of the plurality of mixing elements to provide rotational movement thereof.

12. The apparatus of claim 9, wherein the control unit includes a discrete control box and controller.

13. The apparatus of claim 9, wherein the plurality of outputs from the one or more of the transmission and torque sensor include a temperature signal and a pressure signal, and wherein the control program includes pre-determined values for safe operation of the transmission, which are compared with the temperature signal and pressure signal received by the control unit from the transmission.

14. The apparatus of claim 13, wherein the control unit provides a command to the transmission to shift to a lower gear ratio when the temperature signal received by the control unit exceeds the pre-determined value.

15. The apparatus of claim 9, wherein the output to the transmission from the control unit to change gear ratios is based on both the speed signal and the detected torque demand.

* * * * *